(12) United States Patent
Henkel et al.

(10) Patent No.: US 11,025,088 B2
(45) Date of Patent: Jun. 1, 2021

(54) PARAMETERIZABLE ENERGY-SUPPLY APPARATUS

(71) Applicant: Phoenix Contact GmbH & Co. KG, Blomberg (DE)

(72) Inventors: Hartmut Henkel, Blomberg (DE); Jochen Zeuch, Blomberg (DE); Patrick Schweer, Hameln (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 75 days.

(21) Appl. No.: 15/305,032

(22) PCT Filed: Apr. 23, 2015

(86) PCT No.: PCT/EP2015/058816
§ 371 (c)(1),
(2) Date: Oct. 18, 2016

(87) PCT Pub. No.: WO2015/165798
PCT Pub. Date: Nov. 5, 2015

(65) Prior Publication Data
US 2017/0187236 A1 Jun. 29, 2017

(30) Foreign Application Priority Data

Apr. 28, 2014 (DE) .................. 10 2014 105 911.5

(51) Int. Cl.
*H02J 13/00* (2006.01)
*H02M 1/00* (2006.01)
*G05B 15/02* (2006.01)

(52) U.S. Cl.
CPC .............. *H02J 13/00* (2013.01); *G05B 15/02* (2013.01); *H02M 1/00* (2013.01)

(58) Field of Classification Search
CPC ............ H02J 13/00; G05B 15/02; H02M 1/00
See application file for complete search history.

(56) References Cited

U.S. PATENT DOCUMENTS

2004/0107398 A1* 6/2004 Johnson ................ H03M 13/09
714/758
2005/0108442 A1* 5/2005 Aschenbrenner .. G05B 19/0423
710/1

(Continued)

FOREIGN PATENT DOCUMENTS

| CN | 1802619 A | 7/2006 |
| CN | 1978117 A | 6/2007 |

(Continued)

OTHER PUBLICATIONS

ISA/EP International Search Report, Int'l Application No. PCT/EP2015/058816, dated Jul. 13, 2015, European Patent Office, Rijswijk, NL, 37 pgs.

(Continued)

*Primary Examiner* — Mohamed Barakat
(74) *Attorney, Agent, or Firm* — Holland & Hart LLP

(57) ABSTRACT

The present disclosure relates to a parameterizable energy supply apparatus comprising a communications interface for receiving parametrizing data via a communications network; and a processor which is designed to adjust an output characteristic of the parameterizable energy supply apparatus on the basis of the parametrizing data received.

16 Claims, 8 Drawing Sheets

(56) References Cited

U.S. PATENT DOCUMENTS

| | | | | |
|---|---|---|---|---|
| 2008/0102754 | A1* | 5/2008 | Heinemann | G05B 19/4183 455/41.2 |
| 2011/0063879 | A1* | 3/2011 | Murata | H02M 3/33523 363/21.13 |
| 2012/0223687 | A1* | 9/2012 | Liu | H02M 3/1588 323/271 |
| 2012/0266007 | A1* | 10/2012 | Menon | G06F 1/26 713/340 |
| 2014/0043006 | A1* | 2/2014 | Tan | H02M 3/157 323/298 |
| 2014/0070919 | A1* | 3/2014 | Jackson | G08C 17/02 340/5.61 |
| 2014/0084889 | A1* | 3/2014 | Kuroiwa | H02M 3/157 323/283 |
| 2015/0130296 | A1* | 5/2015 | Washiro | B60L 11/1816 307/140 |
| 2015/0195099 | A1* | 7/2015 | Imes | G05B 15/02 700/275 |

FOREIGN PATENT DOCUMENTS

| | | |
|---|---|---|
| CN | 103477302 A | 12/2013 |
| CN | 104199400 A | 12/2014 |
| KR | 2011 0029381 A | 3/2011 |

OTHER PUBLICATIONS

Wikipedia as Edited by Dsimic, Power Supply, Apr. 2, 2014, 6 pgs., Retrieved from Wikipedia.org at 21:44 on Oct. 31, 2014.

Lambda GmbH, GenesysContral 3.0 Benutzerhandbuch, Rev1.2, user manual version of 2006, 26 pgs.

Lambda GmbH, Genesys—Programmable DC Power Supplies 750W/ 1500W in 1U Built-in RS-232 & RS-485 Interface IEEE468.2 SCPI (GPIB) optional, version of 2007, 8 pgs.

\* cited by examiner

PARAMETERIZABLE ENERGY-SUPPLY APPARATUS

CROSS-REFERENCE TO RELATED APPLICATIONS

The present application is a 371 national phase filing of International Application No. PCT/EP2015/058816, entitled "PARAMETERIZABLE ENERGY-SUPPLY APPARATUS", filed 23 Apr. 2015, which claims priority to German Patent Application No, 10 2014 105 911.5, entitled "PARAMETRISIERBARES ENERGIEVERSORGUNGSGERAT", filed 28 Apr. 2014.

BACKGROUND

The present invention relates to the parameterization of an energy supply device.

A parameterizable energy supply device such as a universal voltage supply unit or a universal current supply unit frequently has a predetermined, non-adjustable output characteristic, e.g. a voltage/current output characteristic. If the energy supply device is for example designed as a universal voltage supply unit, an amplitude value of the parameterizable energy supply device output voltage can frequently be regulated but not, however, the amplitude value of the corresponding output current and thus the voltage/current output characteristic of the parameterizable energy supply device.

SUMMARY

The task on which the present disclosure is based is that of specifying an efficient concept for the setting of a parameterizable energy supply device output characteristic.

The subject matter solves this task by means of the features of the independent claims. Examples of the principles of this disclosure constitute the subject matter of the figures, the description and the dependent claims.

According to a first aspect of the disclosure, the task is solved by a parameterizable energy supply device comprising: a communication interface for receiving parameterizing data via a communications network; and a processor which is designed to set an output characteristic of the parameterizable energy supply device on the basis of the received parameterizing data. This thereby achieves the advantage of being able to provide a parameterizable energy supply device having a configurable output characteristic.

The parameterizable energy supply device can be an electrical energy supply device such as a voltage supply unit or a current supply unit having at least one configurable output characteristic. The parameterizable energy supply device can further comprise an electronically adjustable potentiometer for setting an amplitude value of an output voltage or an output current of the parameterizable energy supply device.

The communication interface can comprise a wired and/or wireless communication interface. For example, the communication interface comprises a serial interface, an interface pursuant to the Power Management Bus (PMBus) standard, an interface pursuant to the Universal Serial Bus (USB) standard, a wireless communication interface via Radio Frequency identification (MD), e.g. pursuant to the ISO/IEC 14443 or ISO/IEC 18000-3 standard, a wireless communication interface via Near Field Communication (NFC), e.g. pursuant to the ISO/IEC 14443 or ISO/IEC 18092 standard, or a wireless communication interface pursuant to one of the Bluetooth, ZigBee or Wireless Local Area Network (W-LAN) standards. The communications network can be a telephone network, a mobile communications network, a computer network, e.g. a Local Area Network (LAN) or a Wireless Local Area Network (W-LAN), or the internet.

The output characteristic can be a voltage/current output characteristic of the parameterizable energy supply device. The parameterizing data can characterize or comprise an output characteristic or an output characteristic parameter of an output characteristic. The processor can be designed to set the output characteristic by selecting a pre-stored output characteristic and/or by regulating an output characteristic parameter of the output characteristic. The processor can be further designed to check the received parameterizing data for validity, e.g. checking the validity of the parameterizing data by means of cyclic redundancy, e.g. pursuant to the Cyclic Redundancy Check 8 (CRC-8) standard.

In one example of the parameterizable energy supply device, the processor is designed to select the output characteristic from a plurality of pre-stored output characteristics based on the parameterizing data received in order to set the output characteristic and/or set an output characteristic parameter of the output characteristic of the parameterizable energy supply device based on the parameterizing data received in order to set the output characteristic. This thereby achieves the advantage of enabling the efficient setting of the output characteristic.

The plurality of pre-stored output characteristics can be pre-stored in a memory of the parameterizable energy supply device.

In a further example of the parameterizable energy supply device, the received parameterizing data characterizes an output characteristic and/or an output characteristic parameter of an output characteristic, particularly an output current, an output voltage or a frequency. This thereby achieves the advantage of the parameterizing data comprising a particularly low volume of data.

In a further example of the parameterizable energy supply device, the output characteristic is one of the following output characteristics: a voltage/current output characteristic, a voltage/current output characteristic having current limitation, a foldback output characteristic, a hiccup mode output characteristic, a fuse mode output characteristic, an output characteristic having dynamic boost or a storage medium charging characteristic. This thereby achieves the advantage of enabling the efficient setting of an output characteristic.

In a further example of the parameterizable energy supply device, the processor is designed to set an output characteristic parameter of the output characteristic on the basis of the received parameterizing data, wherein the output characteristic parameter of the output characteristic comprises at least one of the following parameters: an output current, an amplitude threshold of the output current, particularly a maximum output current, an output voltage, an amplitude threshold of the output voltage, particularly a maximum output voltage, a frequency, a frequency threshold for the frequency, or a point or interval of time. This thereby achieves the advantage of being able to change an output characteristic of the parameterizable energy supply device.

In a further example of the parameterizable energy supply device, the processor is further designed to increase or decrease an output characteristic gradient or change a gradient direction of the gradient upon an output voltage or output current of the parameterizable energy supply device reaching an amplitude threshold. This thereby achieves the advantage of enabling the setting of a characteristic of the output characteristic.

The output characteristic gradient can be positive, negative or zero.

In a further example of the parameterizable energy supply device, the processor is further designed to set one amplitude value of an output voltage or output current of the parameterizable energy supply device to a first amplitude value at a first point in time and to a second amplitude value at a second pint in time in order to set the output characteristic. This thereby achieves the advantage of being able to set a time-dependent output characteristic.

The respective amplitude value and/or the respective time point can be pre-stored in a memory of the parameterizable energy supply device or comprised in the parameterizing data.

In a further example of the parameterizable energy supply device, the processor is further designed to reset an amplitude value of an output voltage or output current of the parameterizable energy supply device subject to the output characteristic should an actual amplitude value of the output voltage or output current of the parameterizable energy supply device differ from a respectively corresponding target value pursuant to the output characteristic. This thereby achieves the advantage of enabling efficient monitoring and regulating of the output characteristic.

The actual amplitude value can be detected by a detection mechanism integrated into the parameterizable energy supply device. The parameterizable energy supply device for example comprises a microcontroller for detecting the actual amplitude value.

In a further example of the parameterizable energy supply device, the parameterizable energy supply device is designed with a memory for storing the received parameterizing data, wherein the processor is designed to read out the parameterizing data from the memory and set the output characteristic of the parameterizable energy supply device on the basis of the parameterizing data as read. This thereby achieves the advantage of the output characteristic being able to be permanently stored in the electrical power supply device.

The memory can comprise an electrically erasable programmable read-only memory, e.g. Electrically Erasable Programmable Read-Only Memory (EEPROM). The processor can further be designed to read the parameterizing data from the memory upon the parameterizable energy supply device being activated.

In a further example of the parameterizable energy supply device, the communication interface is designed to receive the parameterizing data from a communication device via the communications network. This thereby achieves the advantage of being able to efficiently parameterize the parameterizable energy supply device.

The communication device can be a computer, a smartphone or a hand-held device.

In a further example of the parameterizable energy supply device, the communication interface comprises a wireless communication interface. This thereby achieves the advantage of the parameterizable energy supply device and the communication device being able to be galvanically isolated.

In a further example of the parameterizable energy supply device, the communication interface comprises a near field communication interface. This thereby achieves the advantage of enabling the use of an efficient wireless communication interface.

The near field communication interface can be designed to communicate via Near Field Communication (NFC), e.g. pursuant to the ISO/IEC 14443 or ISO/IEC 18092 standard.

In a further example of the parameterizable energy supply device, the communication interface can be wirelessly supplied with electrical energy. This thereby achieves the advantage of the output characteristic being able to be set when the parameterized power supply device is in a deactivated state.

The output characteristic of the parameterizable energy supply device can furthermore be set when the parameterizable energy supply device is accommodated within a casing.

In a further example of the parameterizable energy supply device, the communication interface can be supplied with electrical energy by a communication device. This thereby achieves the advantage of being able to efficiently supply the parameterizable energy supply device with electrical energy.

The communication device can furthermore supply the parameterizable energy supply device with electrical energy by means of a wired communications link, e.g. pursuant to the Universal Serial Bus (USB) standard.

In a further example of the parameterizable energy supply device, the communication interface comprises an antenna which is arranged within a housing of the parameterizable energy supply device or integrated into a housing wall of a parameterizable energy supply device housing. This thereby achieves the advantage of enabling a particularly compact design to the parameterizable energy supply device.

The antenna can be formed by circuit paths on a circuit board or printed circuit board. The housing of the parameterizable energy supply device can furthermore be a plastic housing or comprise a housing element through which electromagnetic signals can pass.

According to a second aspect of the disclosure, the task is solved by a communication device for wirelessly setting an output characteristic of a parameterizable energy supply device which comprises: a user interface for defining parameterizing data; and a near field communication interface for transmitting the defined parameterizing data to the parameterizable energy supply device via a near field communication network. This thereby achieves the advantage of being able to provide a communication device to efficiently set an output characteristic of a parameterizable energy supply device.

The communication device can be a computer, a smartphone or a hand-held device. The communication device can furthermore be a mobile communication device. The user interface can comprise a keyboard, a display mechanism and/or a touchscreen.

The near field communication interface can be designed to communicate by means of near field communication (NFC), e.g. pursuant to the ISO/IEC 14443 or ISO/IEC 18092 standard.

In one example of the communication device, the near field communication interface of the communication device is further designed to wirelessly supply a near field communication interface of the parameterizable energy supply device with electrical energy. This thereby achieves the advantage of being able to set the output characteristic when the parameterizable power supply device is deactivated.

According to a third aspect of the disclosure, the task is solved by a method for setting an output characteristic of a parameterizable energy supply device which comprises: transmitting parameterizing data to the parameterizable energy supply device over a communications network; and setting the output characteristic of the parameterizable energy supply device based on the parameterizing data received. This thereby achieves the advantage of being able to efficiently set the output characteristic of the parameterizable energy supply device.

The output characteristic can be set by selecting a pre-stored output characteristic and/or by regulating an output characteristic parameter of the output characteristic.

In one example of the method, the parameterizing data is transmitted over a near field communication network. This thereby achieves the advantage of being able to use an efficient communications network.

BRIEF DESCRIPTION OF THE DRAWINGS

Examples of the principles of this disclosure are depicted in the drawings and will be described in greater detail below.

DETAILED DESCRIPTION

Figure 1:
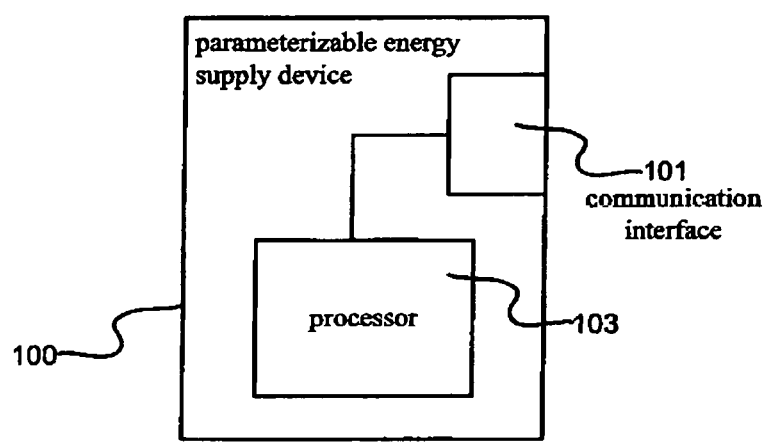
FIG. 1 shows a schematic diagram of an example of a parameterizable energy supply device.

FIG. 1 shows a schematic diagram of a parameterizable energy supply device 100 according to one example of the principles of this disclosure. The parameterizable energy supply device 100 comprises a communication interface 101 and a processor 103.

The parameterizable energy supply device 100 is designed with: the communication interface 101 for receiving parameterizing data over a communications network; and the processor 103 which is designed to set an output characteristic of the parameterizable energy supply device 100 on the basis of the received parameterizing data.

The parameterizable energy supply device 100 can be an electrical energy supply device such as a voltage supply unit or a current supply unit having at least one configurable output characteristic. The parameterizable energy supply device 100 can further comprise an electronically adjustable potentiometer for setting an amplitude value of an output voltage or an output current of the parameterizable energy supply device 100.

The communication interface 101 can comprise a wired or wireless communication interface. For example, the communication interface 101 comprises a serial interface, an interface pursuant to the Power Management Bus (PMBus) standard, an interface pursuant to the Universal Serial Bus (USB) standard, an interface for wireless communication via Radio Frequency Identification (RFID), e.g. pursuant to the ISO/IEC 14443 or ISO/IEC 18000-3 standard, an interface for wireless communication via Near Field Communication (NFC), e.g. pursuant to the ISO/IEC 14443 or ISO/IEC 18092 standard, or a wireless communication interface pursuant to one of the Bluetooth, ZigBee or Wireless Local Area Network (W-LAN) standards. The communications network can be a telephone network, a mobile communications network, a computer network, e.g. a Local Area Network (LAN) or a Wireless Local Area Network (NV-LAN), or the Internet.

The output characteristic can be a voltage/current output characteristic of the parameterizable energy supply device 100. The parameterizing data can characterize or comprise an output characteristic or an output characteristic parameter of an output characteristic. The processor 103 can be designed to set the output characteristic by selecting a pre-stored output characteristic and/or by regulating an output characteristic parameter of the output characteristic. The processor 103 can be further designed to check the received parameterizing data for validity, e.g. checking the validity of the parameterizing data by means of cyclic redundancy, e.g. pursuant to the Cyclic Redundancy Check 8 (CRC-8) standard.

According to one example, the parameterizable energy supply device 100 or an electrical power supply can be parameterized such that any output current limitation and/or any output voltage limitation can be set.

According to a further example, the parameterizing data or the respective limit parameters for output voltage, output current and/or output power are freely adjustable.

According to a further example, the communication interface 101 can be or comprise a wired or wireless interface, for example an interface for wireless communication via Radio Frequency Identification (RFID) or Near Field Communication (NFC) communication.

According to a further example, the communication interface 101 can be designed as a wireless communication interface in order to obtain galvanic isolation between the parameterizable energy supply device 100 and a communication device for the parameterizing of the parameterizable energy supply device 100 and prevent transient currents over the communication interface 101.

Figure 2:
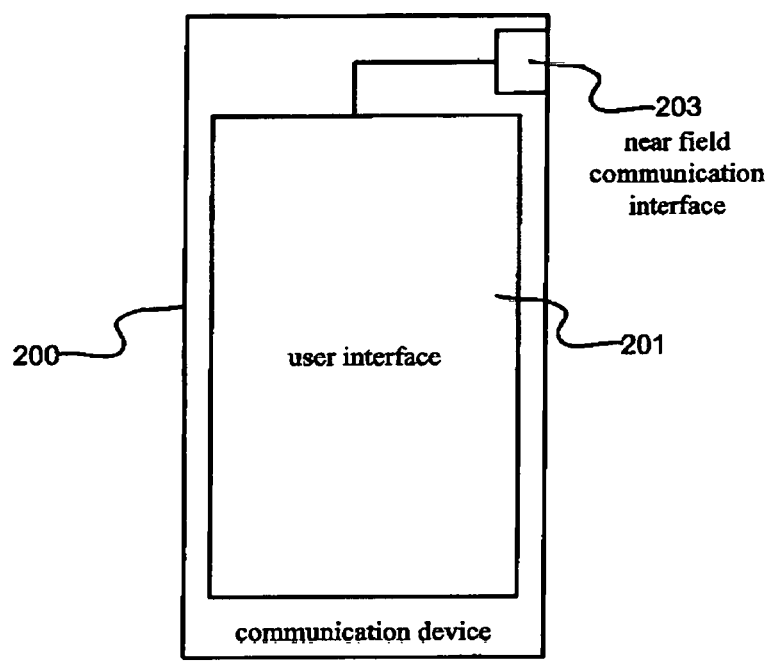
FIG. 2 shows a schematic diagram of an example of a communication device for wirelessly setting an output characteristic of a parameterizable energy supply device.

FIG. 2 shows a schematic diagram of a communication device 200 for the wireless setting of an output characteristic of a parameterizable energy supply device 100 according to one embodiment. The communication device 200 comprises a user interface 201 and a near field communication interface 203.

The communication device 200 for wirelessly setting an output characteristic of the parameterizable energy supply device 100 is designed with: the user interface 201 for defining parameterizing data; and the near field communication interface 201 for transmitting the defined parameterizing data to the parameterizable energy supply device 100 via a near field communication network.

The communication device 200 can be a computer, a smartphone or a hand-held device. The communication device 200 can furthermore be a mobile communication device. The user interface 201 can comprise a keyboard, a display mechanism and/or a touchscreen.

The near field communication interface 203 can be designed to communicate via Near Field Communication (NFC), e.g. pursuant to the ISO/IEC 14443 or ISO/IEC 18092 standard. The near field communication interface 203 of the communication device 200 can be further designed to wirelessly supply electrical energy to a near field communication interface of the parameterizable energy supply device 100.

According to one example, the communication device 200 can realize a parameterizing or a setting of the output characteristic of the parameterizable energy supply device 100 in a deactivated state of the parameterizable energy supply device 100.

Figure 3:
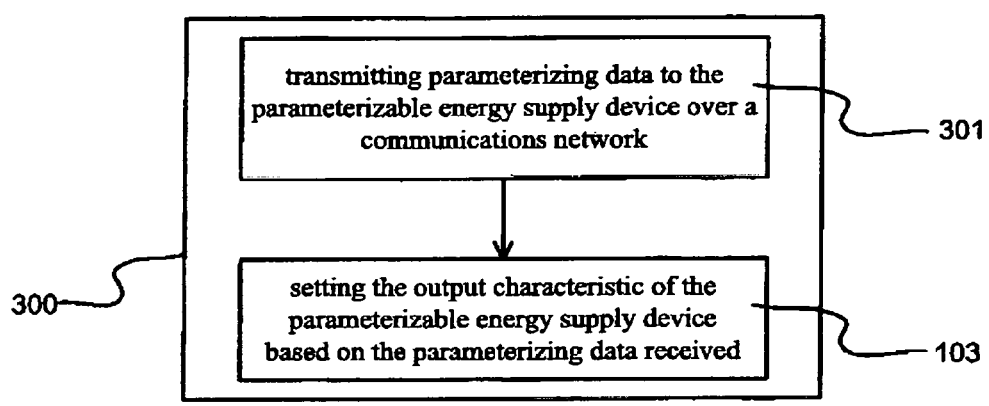
FIG. 3 shows a schematic diagram of a method for setting an output characteristic of a parameterizable energy supply device.

FIG. 3 shows a schematic diagram of a method 300 for setting an output characteristic of a parameterizable energy supply device 100 according to one embodiment. The method 300 comprises the method steps of transmitting 301 and setting 303.

The method 300 for setting an output characteristic of a parameterizable energy supply device 100 comprises: transmitting 301 parameterizing data to the parameterizable energy supply device 100 over a communications network; and setting 303 the output characteristic of the parameterizable energy supply device 100 based on the parameterizing data received.

The setting 303 of the output characteristic can be realized by selecting a pre-stored output characteristic and/or by regulating an output characteristic parameter of the output characteristic. Furthermore, the parameterizing data can be transmitted over a near field communication network.

FIGS. 4 to 8 show configurable output characteristics of a parameterizable energy supply device 100.

Figure 4:
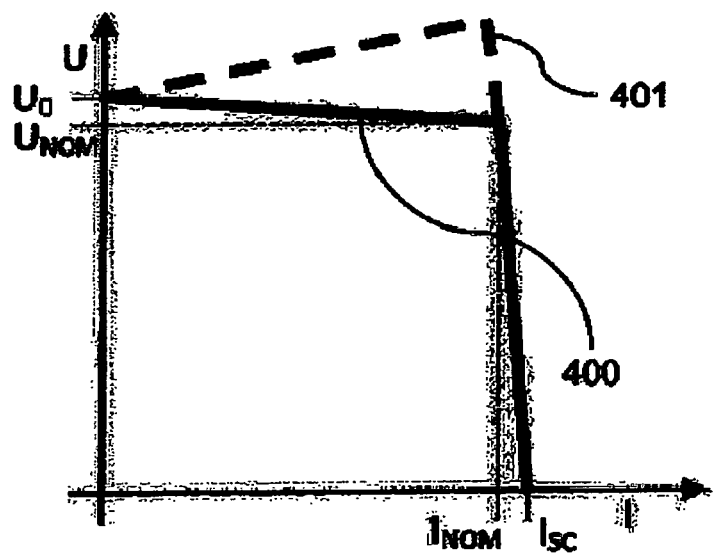
FIG. 4 shows a schematic diagram of two voltage/current output characteristics.

FIG. 4 shows a schematic diagram of two voltage/current output characteristics 400, 401. An output voltage U of a parameterizable energy supply device 100 is plotted on the vertical axis of the depicted coordinate system and a corresponding output current I of the parameterizable energy supply device 100 is plotted on the horizontal axis.

If the parameterizable energy supply device 100 is configured as a voltage source, the output voltage U is set to a no-load output voltage $U_0$ for the voltage/current output characteristic 400 in a no-load condition of the parameterizable energy supply device 100 and there is no flow of output current I. Upon the output current I increasing, the output voltage U decreases linearly at a first gradient until reaching a nominal load output voltage $U_{NOM}$. When the output voltage U reaches the nominal load output voltage $U_{NOM}$, the output current I has risen to a nominal load output current $I_{NOM}$. This state can correspond to a preferential operating state of the parameterizable energy supply device 100. If the output current I increases further, the output voltage U then decreases linearly at a second gradient, wherein the second gradient is greater than the first gradient in terms of absolute value. Upon the output current I reaching a short-circuit output current $I_{SC}$, the output voltage U reaches a minimum value. E.g. the minimum value is 0.0001 V, 0.001 V, 0.01 V, 0.1 V, 1 V or 10 V. The current limitation of the output current I to the short-circuit output current $I_{SC}$ can correspond to a hard short circuit at which there is a flow of output current I.

The no-load output voltage $U_0$ can correspond to an output voltage U under no-load conditions. The nominal load output voltage $U_{NOM}$ can further correspond to an output voltage U at nominal load. The nominal load output current $I_{NOM}$ can correspond to an output current limit value at nominal voltage. The short-circuit output current $I_{SC}$ can further correspond to an output current I in short-circuit state.

If the parameterizable energy supply device 100 is configured as a voltage source, the output voltage U is set to a no-load output voltage $U_0$ for the voltage/current output characteristic 400 in a no-load condition of the parameterizable energy supply device 100 and there is no flow of output current I. Upon the output current I increasing, the output voltage U increases linearly at a third gradient until reaching a nominal load output voltage which can be higher than the nominal load output voltage $U_{NOM}$ of the voltage/current output characteristic 400. When the output voltage U reaches the nominal load output voltage, the output current I has risen to a nominal load output current which can be lower than the nominal load output current $I_{NOM}$ of the voltage/current output characteristic 400. This state can correspond to a preferential operating state of the parameterizable energy supply device 100. If the output current I increases further, the output voltage U then decreases linearly at a fourth gradient. Upon the output current I reaching a short-circuit output current $I_{SC}$, the output voltage U reaches a minimum value. E.g. the minimum value is 0.0001 V, 0.001 V, 0.01 V, 0.1 V, 1 V or 10 V. The current limitation of the output current I to the short-circuit output current $I_{SC}$ can correspond to a hard short circuit at which there is a flow of output current I.

According to one example, the no-load output voltage $U_0$, the nominal load output voltage $U_{NOM}$, the nominal load output current $I_{NOM}$, the short-circuit output current $I_{SC}$ and/or the respective gradient can be regulated in order to set the output characteristic.

According to a further example, output characteristic parameters of the output characteristic can be freely expanded. For example, an output current can adjustably render a voltage drop. A current limitation can furthermore be set as a function of the output voltage U.

According to a further example, a fuse mode output characteristic can correspond to the output characteristic progression of one of the voltage/current output characteristics 400, 401. If, however, the output current I exceeds a predetermined current limit value or the output voltage U falls short of a predetermined voltage limit value, the parameterizable energy supply device 100 can turn off automatically after a predetermined interval of time. A user can, for example, manually reset or switch the parameterizable energy supply device 100 back on again.

According to a further example, the parameterizable energy supply device 100 can be designed as a power source. In this case, the voltage/current output characteristics 400, 401 can likewise be progressed as described above. Only the voltages and currents need to be interchanged.

Figure 5:
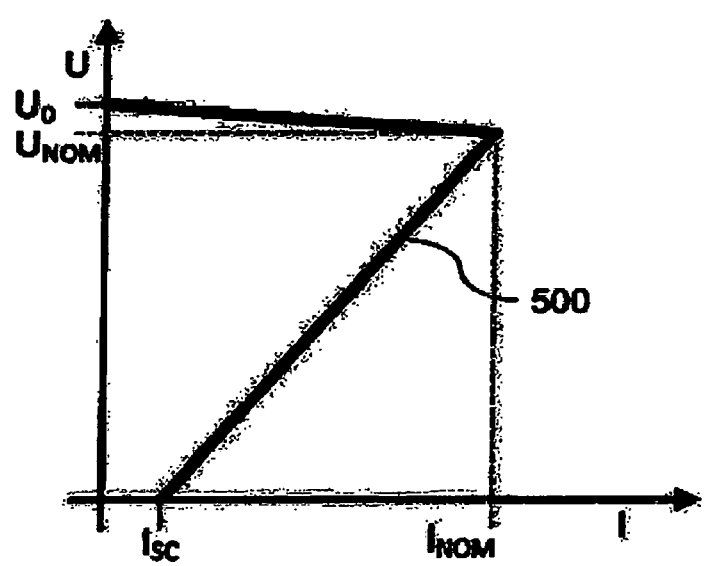
FIG. 5 shows a schematic diagram of a foldback output characteristic.

FIG. 5 shows a schematic diagram of a foldback output characteristic 500. An output voltage U of a parameterizable energy supply device 100 is plotted on the vertical axis of the depicted coordinate system and a corresponding output current I of the parameterizable energy supply device 100 is plotted on the horizontal axis.

If the parameterizable energy supply device 100 is configured as a voltage source, the output voltage U is set to a no-load output voltage $U_0$ in a no-load condition of the parameterizable energy supply device 100 and there is no flow of output current I. Upon the output current I increasing, the output voltage U decreases linearly at a first gradient until reaching a nominal load output voltage $U_{NOM}$. When the output voltage U reaches the nominal load output voltage $U_{NOM}$, the output current I has risen to a nominal load output current $I_{NOM}$. The output voltage U and the output current I decrease linearly at a second gradient as the process continues, wherein the second gradient is greater than the first gradient in terms of the absolute value. Upon the output current I reaching a short-circuit output current $I_{SC}$, the output voltage U reaches a minimum value. E.g. the minimum value is 0.0001 V, 0.001 V, 0.01 V, 0.1 V, 1 V or 10 V. The current limitation of the output current I to the short-circuit output current $I_{SC}$ can correspond to a hard short circuit at which there is a flow of output current I.

According to one example, the nominal load output voltage $U_{NOM}$ can be higher than the no-load output voltage $U_0$. In this case, upon an increase in the output current I, the output voltage U increases linearly at a further gradient from the no-load output voltage $U_0$ until reaching the nominal load output voltage $U_{NOM}$.

According to one example, the no-load output voltage $U_0$, the nominal load output voltage $U_{NOM}$, the nominal load output current $I_{NOM}$, the short-circuit output current $I_{SC}$ and/or the respective gradient can be regulated in order to set the output characteristic.

According to a further example, the parameterizable energy supply device 100 can be operated in voltage regulation until reaching the nominal load output current $I_{NOM}$ or a current limit value. As the process continues, the parameterizable energy supply device 100 can be operated under current limitation until reaching a hard short circuit. The nominal load output current $I_{NOM}$ or the current limit value can be reduced upon decreasing output voltage U in order to reduce cable loading upon overload.

According to a further example, the parameterizable energy supply device 100 can be designed as a power source. In this case, the foldback output characteristic 500 can likewise be progressed as described above. Only the voltages and currents need to be interchanged.

Figure 6:
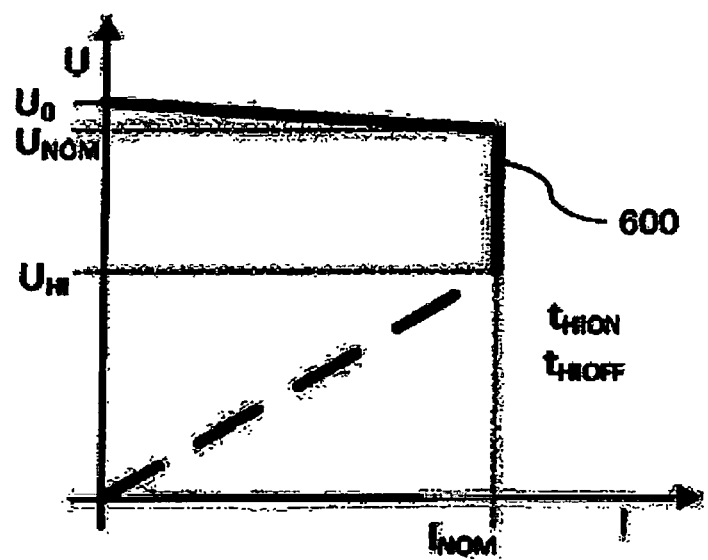
FIG. 6 shows a schematic diagram of a hiccup mode output characteristic.

FIG. 6 shows a schematic diagram of a hiccup mode output characteristic 600. An output voltage U of a parameterizable energy supply device 100 is plotted on the vertical axis of the depicted coordinate system and a corresponding output current I of the parameterizable energy supply device 100 is plotted on the horizontal axis.

If the parameterizable energy supply device 100 is configured as a voltage source, the output voltage U is set to a no-load output voltage $U_0$ in a no-load condition of the parameterizable energy supply device 100 and there is no flow of output current I. Upon the output current I increasing, the output voltage U decreases linearly at a first gradient until reaching a nominal load output voltage $U_{NOM}$. When the output voltage U reaches the nominal load output voltage $U_{NOM}$ the output current I has risen to a nominal load output current $I_{NOM}$. As the process continues, the output voltage U decreases while the output current I remains constant at the nominal load output current $I_{NOM}$. Once the output voltage U drops below an output voltage threshold value $U_{HI}$, the parameterizable energy supply device 100 is switched off for a first time interval $t_{HIOFF}$ and thereafter restarted. If no valid output variable is reached in the further course of the process after a second interval of time $t_{HION}$, the restart can be aborted and then restarted again after the end of the first time interval $t_{HIOFF}$. This process can be repeated if necessary.

According to one example, the nominal load output voltage $U_{NON}$ can be higher than the no-load output voltage $U_0$. In this case, upon an increase of the output current I, the output voltage U increases linearly at a further gradient from the no-load output voltage $U_0$ up to the nominal load output voltage $U_{NOM}$.

According to one example, the no-load output voltage $U_0$, the nominal load output voltage $U_{NON}$, the output voltage threshold value $U_{HI}$, the nominal load output current $I_{NOM}$, the respective gradient, the first time interval $t_{HIOFF}$ and/or the second time interval $t_{HION}$ can be regulated in order to set the output characteristic.

According to a further example, the parameterizable energy supply device 100 can be operated in voltage regulation until reaching the nominal load output current $I_{NOM}$ or a current limit value. As the process continues, the parameterizable energy supply device 100 can be operated under voltage or current regulation until reaching a voltage limit value or a current limit value.

According to a further example, the parameterizable energy supply device 100 can be designed as a power source. In this case, the hiccup mode output characteristic 600 can likewise be progressed as described above. Only the voltages and currents need to be interchanged.

Figure 7:
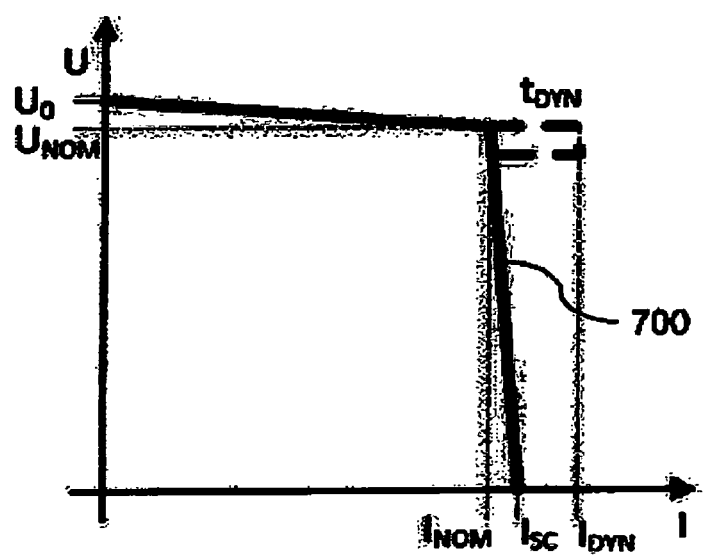
FIG. 7 shows a schematic diagram of an output characteristic with dynamic boost.

FIG. 7 shows a schematic diagram of an output characteristic 700 with dynamic boost. An output voltage U of a parameterizable energy supply device 100 is plotted on the vertical axis of the depicted coordinate system and a corresponding output current I of the parameterizable energy supply device 100 is plotted on the horizontal axis.

If the parameterizable energy supply device 100 is configured as a voltage source, the output voltage U is set to a no-load output voltage $U_0$ in a no-load condition of the parameterizable energy supply device 100 and there is no flow of output current I. Upon the output current I increasing, the output voltage U decreases linearly at a predetermined gradient until reaching a nominal load output voltage $U_{NOM}$. When the output voltage U reaches the nominal load output voltage $U_{NOM}$, the output current I has risen to a nominal load output current $N_{NOM}$. As the process continues, the output current I can increase to a dynamic output current $I_{DYN}$ for one interval of time $t_{DYN}$ while the output voltage U remains set at the nominal load output voltage $U_{NOM}$. The increase in the output current I can be discontinued as the process continues and the further progression of the output characteristic 700 with dynamic boost can correspond to that of a foldback output characteristic 500, a fuse mode output characteristic or a hiccup mode output characteristic 600.

The dynamic output current $I_{DYN}$ can be a time-dependent dynamic output current.

According to one example, the nominal load output voltage $U_{NOM}$ can be higher than the no-load output voltage $U_0$. In this case, upon an increase in the output current I, the output voltage U increases linearly at a further gradient from the no-load output voltage $U_0$ up to the nominal load output voltage $U_{NOM}$.

According to one example, the no-load output voltage $U_0$, the nominal load output voltage $U_{NOM}$, the nominal load output current $I_{NOM}$, the short-circuit output current $I_{SC}$, the dynamic output current $I_{DYN}$, the predetermined gradient and/or the time interval $t_{DYN}$ can be regulated in order to set the output characteristic.

According to a further example, the parameterizable energy supply device 100 can be operated in voltage regulation until reaching the dynamic output current $I_{DYN}$. After time interval $t_{DYN}$, the increase in current can be reset and the output current I can be reset to the nominal load output current $I_{NOM}$ or a current limit value. As the process continues, the further limiting procedure can correspond to that of a foldback output characteristic 500, a fuse mode output characteristic or a hiccup mode output characteristic 600.

According to a further example, the parameterizable energy supply device 100 can be designed as a power source. In this case, the output characteristic 700 with dynamic boost can be likewise progressed as described above. Only the voltages and currents need to be interchanged.

Figure 8:
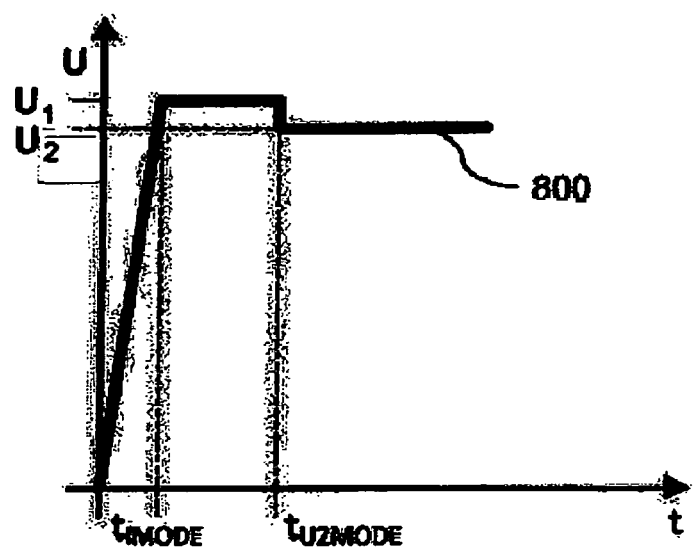
FIG. 8 shows a schematic diagram of a storage medium charging characteristic.

FIG. 8 shows a schematic diagram of a charging characteristic 800 of a storage medium. An output voltage U of a parameterizable energy supply device 100 is plotted on the vertical axis of the depicted coordinate system and the time t is plotted on the horizontal axis.

The charging characteristic 800 can be associated with a constant current and constant voltage charging procedure, such as an IUU charging procedure, for a storage medium like a lead-acid battery. In a first charging phase of the charging characteristic 800, the parameterizable energy supply device 100 charges the storage medium at a constant output current I. In order to keep the output current I constant, the output voltage U of the parameterizable energy supply device 100 is continuously increased as a function of time. Upon the output voltage U reaching a charging output voltage $U_r$ at a first time point $t_{IMODE}$, the parameterizable energy supply device 100 switches into a second charging phase at a constant output voltage U. The output voltage U is hereby set to the charging output voltage $U_1$. The output current I decreases continuously in the second charging phase. Upon reaching the second time point $t_{U2MODE}$, the parameterizable energy supply device 100 switches into a third charging phase at a lower constant output voltage U so as to hold the storage medium charge. The output voltage U is hereby set to an end-of-charge output voltage $U_2$.

The charging output voltage $U_1$ can be a high output voltage after the first charging phase ends or a constant current charge. Furthermore, the first charging phase or the constant current charging phase can be limited in time by the first time point $t_{IMODE}$. The end-of-charge output voltage $U_2$ can be a float voltage or an end-of-charge voltage for the continuous charging of the storage medium.

According to one example, the charging output voltage U, the end-of-charge output voltage the second time point $t_{U2MODE}$ and/or the time interval between time points $t_{IMODE}$ and $t_{U2MODE}$ can be regulated in order to set the output characteristic.

According to one example, the limiting procedures shown in FIGS. 4 to 8 can be freely expanded.

According to a further example, the parameterizable energy supply device 100 can be adapted to different requirements for different applications by the output characteristic selection and a flexible parameterization.

According to a further example, the parameterizable energy supply device 100 can be adapted to safety requirements or for lower cable loading by the parameterizing of output characteristic parameters or limit values.

All of the features described and shown in connection with individual example of the principles of this disclosure can be provided in different combinations in the inventive subject matter so as to realize their advantageous effects simultaneously.

The protective scope of the present invention is conferred by the claims and is not limited by the features defined in the description or illustrated in the figures.

LIST OF REFERENCE NUMERALS

100 parameterizable energy supply device
101 communication interface
103 processor
200 communication device
201 user interface
203 near field communication interface
300 method
301 transmitting
303 setting
400 voltage/current output characteristic
401 voltage current output characteristic
500 foldback output characteristic
600 hiccup mode output characteristic
700 output characteristic
800 charging characteristic U output voltage
$U_0$ no-load output voltage
$U_{NOM}$ nominal load output voltage
$U_{HI}$ output voltage threshold value
$U_1$ charging output voltage
$U_2$ end-of-charge output voltage
I output current
$I_{NOM}$ nominal load output current
$I_{SC}$ short-circuit output current
$t_{DYN}$ dynamic output current
t time
$t_{HIOFF}$ first time interval
$t_{HION}$ second time interval
$t_{DYN}$ time interval
$t_{IMODE}$ first time point
$t_{U2MODE}$ second time point

What is claimed is:

1. A parameterizable energy supply device, comprising:
a communication interface configured to receive parameterizing data via a communications network;
a memory configured to permanently store the received parameterizing data;
a processor configured to read the parameterizing data from the memory and to set an output characteristic of the parameterizable energy supply device based on the read parameterizing data, wherein the processor is further configured to increase and decrease an output characteristic gradient based on an output voltage of the parameterizable energy supply device reaching an amplitude threshold and change a gradient direction of the gradient based on an output voltage or an output current of the parameterizable energy supply device reaching an amplitude threshold, wherein the processor is further configured to check a validity of the read parameterizing data; and
an electronically adjustable potentiometer configured to set an amplitude value of an adjusted output voltage or an adjusted output current of the parameterizable energy supply device;
wherein the output characteristic comprises one or more of: a voltage or current output characteristic having a current limitation, a foldback output characteristic, a hiccup mode output characteristic, a fuse mode output characteristic, an output characteristic having a dynamic boost, or a charging characteristic of a storage medium.

2. The parameterizable energy supply device according to claim 1, wherein the processor is configured to select the output characteristic from a plurality of pre-stored output characteristics based on the received parameterizing data in order to set the output characteristic.

3. The parameterizable energy supply device according to claim 1, wherein the processor is configured to set an output characteristic parameter of the output characteristic based on the received parameterizing data, wherein the output characteristic parameter of the output characteristic comprises at least one of the following parameters: an output current, a maximum output current, an output voltage, a maximum output voltage, a frequency, a frequency threshold for the frequency, or a point in time or interval of time.

4. The parameterizable energy supply device according to claim 1, wherein the processor is further configured to set one amplitude value of an output voltage or output current of the parameterizable energy supply device to a first amplitude value at a first point in time and to a second amplitude value at a second point in time in order to set the output characteristic.

5. The parameterizable energy supply device according to claim 1, wherein the processor is further configured to reset an amplitude value of an output voltage or an output current of the parameterizable energy supply device subject to the output characteristic based on a difference between an actual amplitude value of the output voltage or output current of the parameterizable energy supply device and a respectively corresponding target value pursuant to the output characteristic.

6. The parameterizable energy supply device according to claim 1, wherein the communication interface comprises a near field communication interface.

7. The parameterizable energy supply device according to claim 1, wherein the communication interface is configured to wirelessly receive electrical energy to power the communication interface.

8. The parameterizable energy supply device according to claim 1, wherein the communication interface comprises an antenna arranged within a housing of the parameterizable energy supply device or integrated into a housing wall of a housing of the parameterizable energy supply device.

9. The parameterizable energy supply device according to claim 1, wherein the processor is configured to set an output characteristic parameter of the output characteristic of the parameterizable energy supply device based on the parameterizing data received in order to set the output characteristic.

10. The parameterizable energy supply device according to claim 7, wherein the output characteristic is set while the parameterized power supply device is in a deactivated state.

11. A system, comprising:
a parameterizable energy supply device, comprising
a communication interface configured to receive parameterizing data via a communications network;
a memory configured to permanently store the received parameterizing data;
a processor configured to read the parameterizing data from the memory and to set an output characteristic of the parameterizable energy supply device based on the read parameterizing data, wherein the processor is further configured to increase and decrease an output characteristic gradient based on an output voltage of the parameterizable energy supply device reaching an amplitude threshold and change a gradient direction of the gradient based on an output voltage or output current of the parameterizable energy supply device reaching an amplitude threshold, wherein the processor is further configured to check a validity of the read parameterizing data; and
an electronically adjustable potentiometer configured to set an amplitude value of an adjusted output voltage or an adjusted output current of the parameterizable energy supply device; and
a communication device configured to wirelessly set the output characteristic of the parameterizable energy supply device, comprising
a user interface configured to define parameterizing data; and
a near field communication interface configured to transmit the defined parameterizing data to the parameterizable energy supply device over a near field communication network;
wherein the output characteristic comprises one or more of: a voltage or current output characteristic having a current limitation, a foldback output characteristic, a hiccup mode output characteristic, a fuse mode output characteristic, an output characteristic having a dynamic boost, or a charging characteristic of a storage medium.

12. The communication device according to claim 11, wherein the near field communication interface of the communication device is further configured to wirelessly supply a near field communication interface of the parameterizable energy supply device with electrical energy.

13. A method for setting an output characteristic of a parameterizable energy supply device, comprising:
receiving parameterizing data by the parameterizable energy supply device over a communications network;
permanently storing the received parameterizing data to a memory of the parameterizable energy supply device;
reading, by a processor of the parameterizable energy supply device that is operatively coupled to the memory, the parameterizing data from the memory;
checking a validity of the read parameterizing data;
setting the output characteristic of the parameterizable energy supply device based on the read parameterizing data, wherein the output characteristic comprises one or more of: a voltage or current output characteristic having a current limitation, a foldback output characteristic, a hiccup mode output characteristic, a fuse mode output characteristic, an output characteristic having a dynamic boost, or a charging characteristic of a storage medium;
increasing and decreasing an output characteristic gradient based on an output voltage of the parameterizable energy supply device reaching an amplitude threshold and changing a gradient direction of the gradient based on an output voltage or output current of the parameterizable energy supply device reaching an amplitude threshold; and
setting an amplitude value of an adjusted output voltage or an adjusted output current of the parameterizable energy supply device by an electronically adjustable potentiometer.

14. The method according to claim 13, wherein the communications network comprises a near field communication network.

15. The method according to claim 13, further comprising receiving the parameterizing data over a user interface.

16. The method according to claim 14, further comprising wirelessly supplying a near field communication interface of the parameterizable energy supply device with electrical energy to power the near field communication interface of the parameterizable energy supply.

* * * * *